(12) United States Patent
Wang et al.

(10) Patent No.: US 11,975,846 B2
(45) Date of Patent: May 7, 2024

(54) SYSTEMS, METHODS, AND APPARATUS FOR PASSIVE COOLING OF UAVs

(71) Applicant: QUALCOMM Incorporated, San Diego, CA (US)

(72) Inventors: Peng Wang, San Diego, CA (US); Don Le, San Diego, CA (US); Jon James Anderson, Andover, MA (US); Chinchuan Chiu, Poway, CA (US)

(73) Assignee: QUALCOMM INCORPORATED, San Diego, CA (US)

(*) Notice: Subject to any disclaimer, the term of this patent is extended or adjusted under 35 U.S.C. 154(b) by 0 days.

(21) Appl. No.: 17/247,546

(22) Filed: Dec. 16, 2020

(65) Prior Publication Data
US 2021/0129995 A1     May 6, 2021

Related U.S. Application Data

(62) Division of application No. 15/385,136, filed on Dec. 20, 2016, now abandoned.

(51) Int. Cl.
*B64D 13/00*     (2006.01)
*B64C 39/02*     (2023.01)
(Continued)

(52) U.S. Cl.
CPC .......... *B64D 13/006* (2013.01); *B64C 39/024* (2013.01); *B64D 33/08* (2013.01);
(Continued)

(58) Field of Classification Search
CPC ............. F28D 15/04; F28D 2021/0021; F28D 15/0233; F28D 15/0266; B64C 39/024;
(Continued)

(56) References Cited

U.S. PATENT DOCUMENTS 3,700,028 A    10/1972   Noren
5,369,301 A    11/1994   Hayashi et al.
(Continued)

FOREIGN PATENT DOCUMENTS

CN     1672258 A     9/2005
CN     1902454 A     1/2007
(Continued)

OTHER PUBLICATIONS

International Preliminary Report on Patentability—PCT/US2017/064208, The International Bureau of WIPO—Geneva, Switzerland, dated Mar. 14, 2019.
(Continued)

*Primary Examiner* — Jianying C Atkisson
*Assistant Examiner* — For K Ling
(74) *Attorney, Agent, or Firm* — Muncy, Geissler, Olds & Lowe, P.C.

(57) ABSTRACT

An innovative passive cooling solution with sealed UAV enclosure system allows heat from a semiconductor chip to be dissipated to the ambient environment through evaporation/condensation phase-change cooling and air cooling a heat sink such as a fin without any additional power consumption to operate cooling solution. One example of such a solution may include a pipe with a fin and a fluid. The pipe may include a wick structure along an inner surface of the pipe configured to allow the fluid to travel within the wick structure and to allow a vapor form of the fluid to exit the wick structure towards a center of the pipe.

10 Claims, 8 Drawing Sheets

(51) Int. Cl.
  *B64D 33/08* (2006.01)
  *B64U 10/13* (2023.01)
  *B64U 30/20* (2023.01)
  *F28D 15/02* (2006.01)
  *F28D 15/04* (2006.01)
  *F28D 21/00* (2006.01)

(52) U.S. Cl.
  CPC ......... *F28D 15/0275* (2013.01); *F28D 15/04* (2013.01); *B64U 10/13* (2023.01); *B64U 30/20* (2023.01); *F28D 2021/0021* (2013.01)

(58) Field of Classification Search
  CPC ........ B64C 2201/108; B64C 2201/027; H01L 23/427; H05K 7/20409; B64D 13/006; B64D 33/08; B64U 10/13; B64U 30/20
  See application file for complete search history.

(56) References Cited

U.S. PATENT DOCUMENTS

| | | | | |
|---|---|---|---|---|
| 5,409,055 | A * | 4/1995 | Tanaka | H01L 23/427 |
| | | | | 165/104.33 |
| 6,085,833 | A | 7/2000 | Kimura et al. | |
| 6,152,213 | A | 11/2000 | Suzuki | |
| 6,352,104 | B1 * | 3/2002 | Mok | H01L 23/427 |
| | | | | 165/104.33 |
| 6,478,997 | B2 | 11/2002 | McCullough | |
| 6,525,934 | B1 * | 2/2003 | Nakanishi | H01L 23/38 |
| | | | | 174/16.3 |
| 6,535,386 | B2 * | 3/2003 | Sathe | H01L 23/4006 |
| | | | | 174/15.2 |
| 6,745,825 | B1 * | 6/2004 | Nakamura | F28D 15/046 |
| | | | | 165/104.33 |
| 6,778,394 | B2 * | 8/2004 | Oikawa | F28D 15/0266 |
| | | | | 361/700 |
| 6,880,626 | B2 * | 4/2005 | Lindemuth | F28D 15/0233 |
| | | | | 174/15.2 |
| 6,903,930 | B2 * | 6/2005 | DiStefano | H01L 23/427 |
| | | | | 257/722 |
| 7,131,487 | B2 * | 11/2006 | Chang | F28D 15/02 |
| | | | | 361/689 |
| 7,505,269 | B1 * | 3/2009 | Cosley | F28D 15/0266 |
| | | | | 165/104.33 |
| 8,123,460 | B2 | 2/2012 | Collette | |
| 2008/0105406 | A1 | 5/2008 | Chang et al. | |
| 2010/0254090 | A1 * | 10/2010 | Trautman | F28D 15/0233 |
| | | | | 165/104.26 |
| 2011/0127013 | A1 | 6/2011 | Kawamura et al. | |
| 2011/0303392 | A1 | 12/2011 | Horiuchi et al. | |
| 2013/0312938 | A1 * | 11/2013 | Cheng | F28D 15/06 |
| | | | | 165/104.26 |
| 2014/0116654 | A1 | 5/2014 | McGlaun et al. | |
| 2015/0068703 | A1 | 3/2015 | De et al. | |
| 2015/0276323 | A1 * | 10/2015 | Li | F28D 15/0233 |
| | | | | 165/104.26 |
| 2015/0338170 | A1 | 11/2015 | Mueller et al. | |
| 2016/0152345 | A1 | 6/2016 | Molnar et al. | |
| 2016/0169594 | A1 * | 6/2016 | De Bock | F28F 9/0138 |
| | | | | 165/80.2 |
| 2016/0194069 | A1 | 7/2016 | Taylor | |
| 2018/0170553 | A1 | 6/2018 | Wang et al. | |
| 2018/0273194 | A1 | 9/2018 | Edgar et al. | |

FOREIGN PATENT DOCUMENTS

| | | |
|---|---|---|
| CN | 101575008 A | 11/2009 |
| CN | 102975850 A | 3/2013 |
| CN | 104534740 A | 4/2015 |
| CN | 104883863 A | 9/2015 |
| CN | 204697469 U | 10/2015 |
| CN | 205738119 U | 11/2016 |
| CN | 107089342 A | 8/2017 |
| DE | 69329548 T2 | 6/2001 |
| DE | 102011086786 B3 | 3/2013 |
| EP | 2147859 A2 | 1/2010 |
| EP | 2725262 A1 | 4/2014 |
| EP | 2733069 A1 | 5/2014 |
| GB | 2537950 A | 11/2016 |
| JP | 2000174188 A | 6/2000 |
| JP | 2003283226 A | 10/2003 |
| JP | 2006503436 A | 1/2006 |
| JP | 2009204254 A | 9/2009 |
| JP | 2016175489 A | 10/2016 |
| JP | 2020515031 A | 5/2020 |
| WO | 2016178008 A1 | 11/2016 |

OTHER PUBLICATIONS

International Search Report and Written Opinion—PCT/US2017/064208—ISA/EPO—dated Mar. 21, 2018.
Phillips A.L (Fred)., et al., "Skin As Radiator-Passive Thermal Management for High Altitude Long Endurance-JAVs", SAE Technical Paper Series 1999-01-2501, Aug. 23, 2016, pp. 1-10.
Taiwan Search Report—TW106143455—TIPO—dated Jun. 11, 2021.
Taiwan Search Report—TW106143455—TIPO—dated Nov. 18, 2022.
Taiwan Search Report—TW106143455—TIPO—dated Jun. 8, 2023.

* cited by examiner

SYSTEMS, METHODS, AND APPARATUS FOR PASSIVE COOLING OF UAVs

CLAIM OF PRIORITY

This application is a divisional of U.S. patent application Ser. No. 15/385,136, filed Dec. 20, 2016, and assigned to the assignee hereof and hereby expressly incorporated by reference herein.

FIELD OF DISCLOSURE

This disclosure relates generally to unmanned aerial vehicles (UAVs), and more specifically, but not exclusively, to passive cooling for UAVs.

BACKGROUND

Small UAV systems (sometimes referred to as drones) generate a lot of heat from CPU, GPU, DDR, WiFi, GPS, PMIC, Video/ISP, and Camera Sensor components. This heat poses a significant thermal management challenge to achieve reliable operations of the UAV in harsh environments because high junction temperature, high ambient temperature (40° C.), and radiation from the sun become major thermal barriers to achieve high performance. In addition, skin temperature is also a design constraint as most UAV manufacturers request 45-55° C. as the maximum allowable touch surface temperature to allow users to hold the UAV to preview the camera images, for example.

Thermal management of small UAV systems needs to address both junction and surface temperatures. Currently UAV manufacturers integrate a mini-fan to control chip junction temperature and enclosure surface temperature. However, fan cooling solutions add a serious vulnerability to the entire UAV system: once the fan fails, the overheating of key components would cause the UAV to shut down or lead to permanent electrical or thermo-mechanical failure.

In addition to reliability issues, cost, space, weight, noise, maintenance, additional power consumption to operate a fan, as well as moisture, dust and other contaminants that can damage sensitive electronic components inside the UAV are some of the additional concerns when a fan cooling solution is applied.

Accordingly, there is a need for systems, apparatus, and methods that overcome the deficiencies of conventional approaches including the methods, system and apparatus provided hereby.

SUMMARY

The following presents a simplified summary relating to one or more aspects and/or examples associated with the apparatus and methods disclosed herein. As such, the following summary should not be considered an extensive overview relating to all contemplated aspects and/or examples, nor should the following summary be regarded to identify key or critical elements relating to all contemplated aspects and/or examples or to delineate the scope associated with any particular aspect and/or example. Accordingly, the following summary has the sole purpose to present certain concepts relating to one or more aspects and/or examples relating to the apparatus and methods disclosed herein in a simplified form to precede the detailed description presented below.

In one aspect, a passive cooling apparatus comprises: a pipe with a fin and a fluid, the fin located on a top of the pipe in a first location; a heat source attached to the top of the pipe in a second location, the second location space a first distance from the first location; a propeller located above the fin; and a wick structure along an inner surface of the pipe, the wick structure configured to allow the fluid to travel within the wick structure and to allow a vapor form of the fluid to exit the wick structure towards a center of the pipe.

In another aspect, a passive cooling apparatus, comprises: means for heat transfer, the means for heat transfer configured to transfer heat from a second location to a first location spaced a first distance from the second location; means for heat dissipation, the means for heat dissipation located on a top of the means for heat transfer in the first location; means for heat conduction, the means for heat conduction located in the means for heat transfer; means for air flow, the means for air flow located above the means for heat dissipation; and means for liquid containment along an inner surface of the means for heat transfer, the means for liquid containment configured to allow the means for heat conduction to travel within the means for liquid containment and to allow a vapor form of the means for heat conduction to exit the means for liquid containment towards a center of the means for heat transfer.

In still another aspect, a UAV, comprises: a body; a pipe with a fin and a fluid, the fin located on a top of the pipe in a first location outside the body and the pipe extends from inside the body to outside the body; a heat source attached to the top of the pipe in a second location inside the body, the second location space a first distance from the first location; a propeller located above the fin; and a wick structure along an inner surface of the pipe, the wick structure configured to allow the fluid to travel within the wick structure and to allow a vapor form of the fluid to exit the wick structure towards a center of the pipe.

Other features and advantages associated with the apparatus and methods disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

Figure 1:
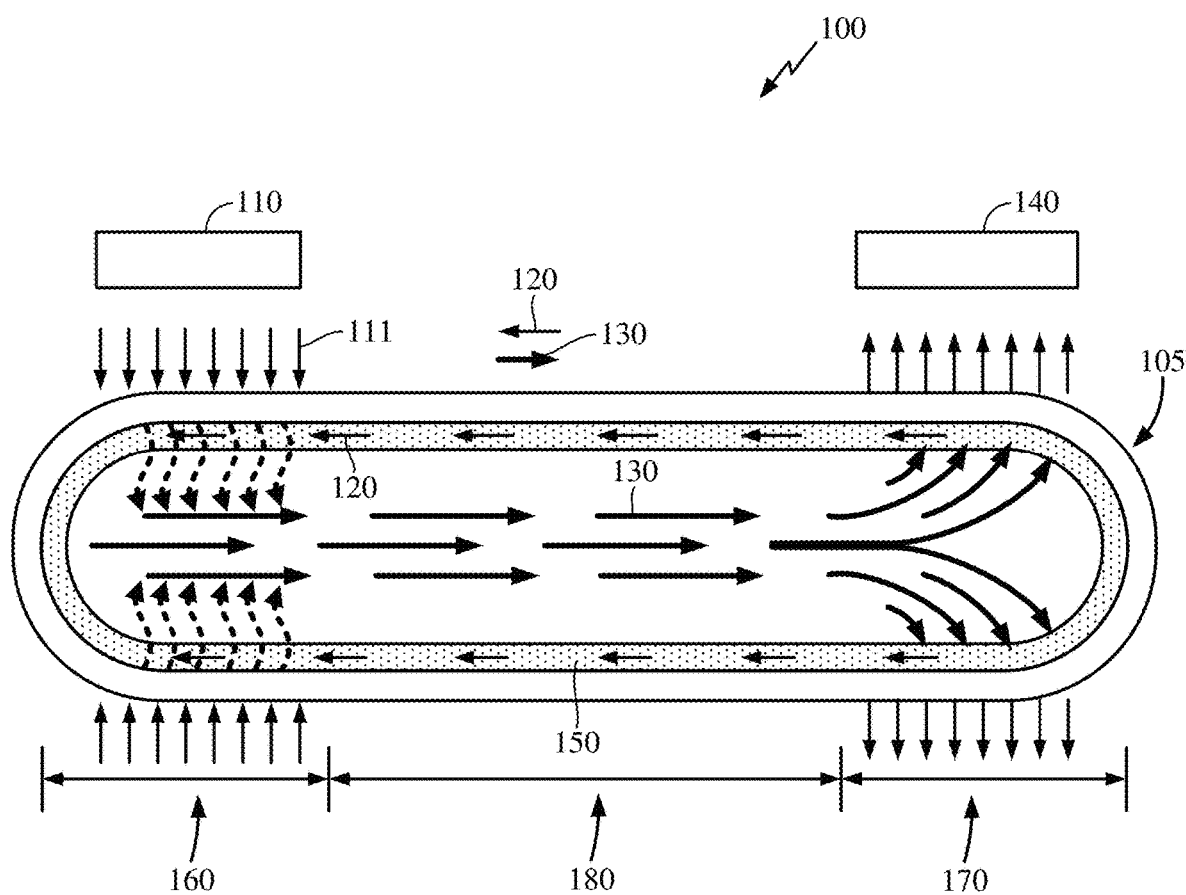
FIG. 1 illustrates one example of a pipe for passive cooling in accordance with some examples of the disclosure.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

The exemplary methods, apparatus, and systems disclosed herein mitigate shortcomings of the conventional methods, apparatus, and systems, as well as other previously unidentified needs. Some examples in this disclosure provide an innovative passive cooling solution with a sealed UAV enclosure system that is lightweight and allows the heat to be dissipated from a semiconductor chip to the ambient environment very efficiently without fan cooling while enabling a hermetic structure of the UAV to maximize system reliability and protect electronics from moisture, dust, and corrosive chemicals. One example includes a pipe with a fin located on a top of the pipe outside the UAV enclosure under a propeller, a fluid inside the pipe, and a wick structure along an inner surface of the pipe. The wick structure configured to allow the fluid to travel within the wick structure from a heat source inside the UAV enclosure where a vapor form of the fluid is generated by the heat from the heat source and exits the wick structure towards a center of the pipe. The vapor then travels in the center of the pipe to the fin location where the fin helps extract the heat and cause the vapor to condense back into the liquid within the wick structure.

FIG. 1 illustrates one example of a pipe for passive cooling in accordance with some examples of the disclosure. A shown in FIG. 1, a passive cooling apparatus 105 may include a pipe 105, a heat source 110 (e.g. a semiconductor die, a memory chip, a battery, etc.) located in a second location that transfers heat 111 to the pipe 105, a heat sink 140 (e.g. a bar shaped fin, a pin fin, or a plurality of pin or bar shaped fins, etc.) located in a first location that removes heat 111 from the pipe 105, a wick structure 150 along an inner surface of the pipe 105, and a fluid 120 inside the wick structure 150. The passive cooling apparatus 100 may be viewed as having three sections—an evaporator section 160 near the heat source 110, a condenser section 170 near the heat sink 140, and an adiabatic section 180 between the evaporator section 160 and the condenser section 170. In the evaporator section 160, the fluid 120 is converted to a vapor 130 and exits the wick structure to the center of pipe 105. In the adiabatic section 180, the vapor 130 travels towards the condenser section 170 in the center of the pipe because of the adiabatic expansion occurring in the evaporator section 160 while the liquid 120 travels towards the evaporator section 160 in the wick structure 150. In the condenser section 170, the vapor 130 is converted back to a liquid 120 and moves into the wick structure 150.

The pipe 105 may be approximately 2-4 mm in width and have a round, oval, square, or rectangular circumference, for example. The pipe 105 may be a straight pipe, an L shaped pipe, an H shaped pipe, or a T shaped pipe, for example. The pipe 105 may have an extremely high thermal conductivity of 10 k W/m-K, for example. The pipe 105 may be composed of aluminum, copper, plastic materials, or a combination of these materials depending on the desired tradeoff between weight and cooling performance. The thickness of the pipe 105 may be varied along the axial direction of the pipe 105 with some portions thicker and some portions thinner to accommodate available space inside the UAV and different chipset heights. The heat pipe thickness may vary from 0.5 mm to 5 mm. The wick structure 150 may be a honeycomb, mesh, fiber, or powder filled micro-scaled wick structure that acts as a passive pump allowing vapor to exit the wick structure 150 and allowing liquid to enter the wick structure 150 as well as travel inside from a first section to the second section in an adiabatic process. The heat sink 140 may be a pin fin or plurality of pin fins, a bar shaped fin or a plurality of bar shaped fins, or similar shapes that remove heat 111 from pipe 105 for dissipation outside the pipe 105. The heat sink 140 may be composed of aluminum, copper, plastic materials, or a combination of these materials depending on the desired tradeoff between weight and cooling performance. The heat source 110 may be a semiconductor chip, a logic chip, a memory chip, a battery, or a similar device that produces heat 111. The heat source 110 may be attached directly to the pipe 105 to allow heat 111 to transfer from the heat source 110 to the pipe 105 or may be attached with a thermally conductive adhesive.

Figure 2:
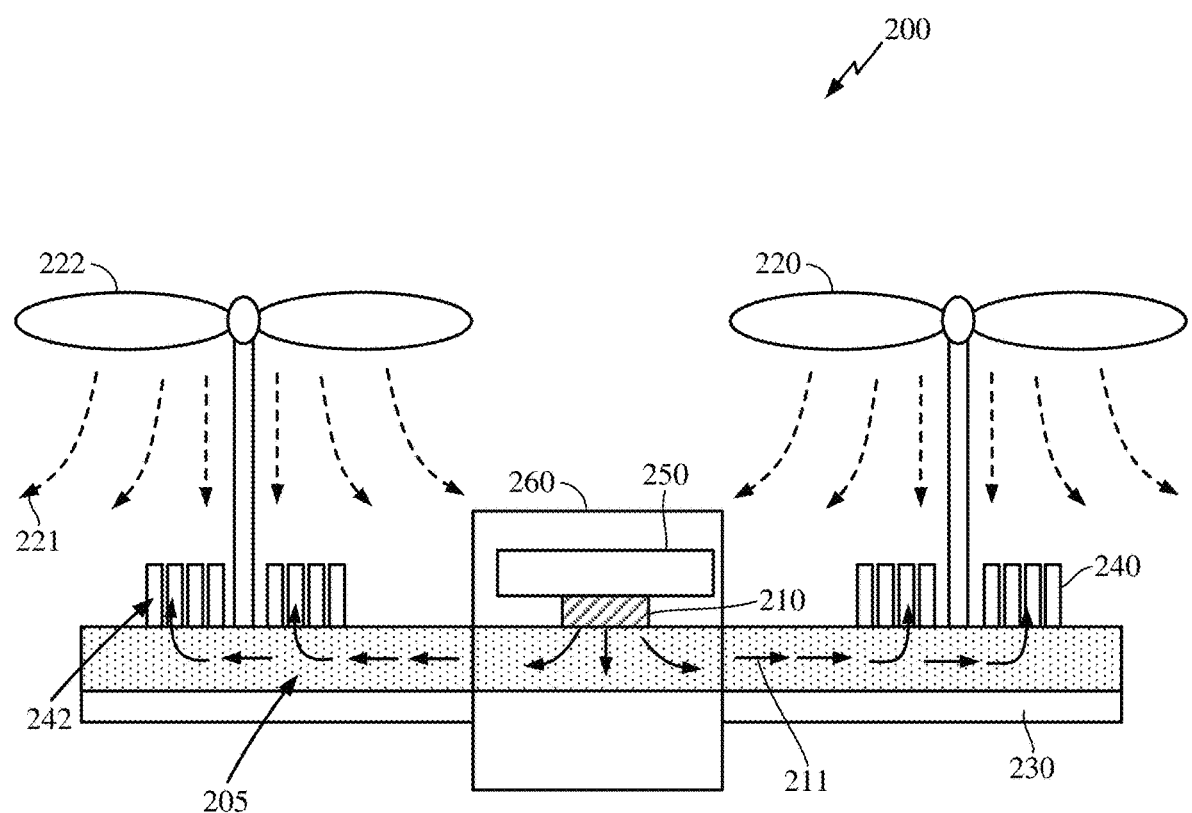
FIG. 2 illustrates one example of an UAV with a pipe for passive cooling in accordance with some examples of the disclosure.

FIG. 2 illustrates one example of an UAV with a pipe for passive cooling in accordance with some examples of the disclosure. As shown in FIG. 2, a UAV passive cooling apparatus 200 may include a pipe 205 (e.g. pipe 105), a semiconductor chip 210 mounted on the pipe 205 in a second location, a first plurality of fins 240 mounted on the pipe 205 in a first location, and a second plurality of fins 242 mounted on the pipe 205 in a third location. The pipe 205 enables heat 211 from the semiconductor chip 210 to travel in the pipe 205 from the second location to both the first plurality of fins 240 in the first location and the second plurality of fins 242 in the third location. The UAV passive cooling apparatus 200 may include a first propeller 220 located above the first plurality of fins 240, a second propeller 222 located above the second plurality of fins 242. The first plurality of fins 220 and the second plurality of fins 222 may provide forced convective cooling air 221 at the first plurality of fins 240 and the second plurality of fins 242 respectively to dissipate heat from heat pipe to ambient air with a bulk airflow of approximately 45 CFM. The UAV passive cooling apparatus 200 may include a boom 230 extending to either side of a body enclosure 260 that houses a printed circuit board 250 attached to the semiconductor chip 210 opposite the pipe 205.

The body enclosure 260 may be plastic or aluminum, for example, and may be hermetically sealed to protect the printed circuit board 250 and the semiconductor chip 210 from moisture, dust, and corrosive chemicals. The boom 230 may be plastic or aluminum, for example, and supports the portion of the pipe 205 extending outside body enclosure 260 as well as the first propeller 220 and the second propeller 222.

Figure 3:
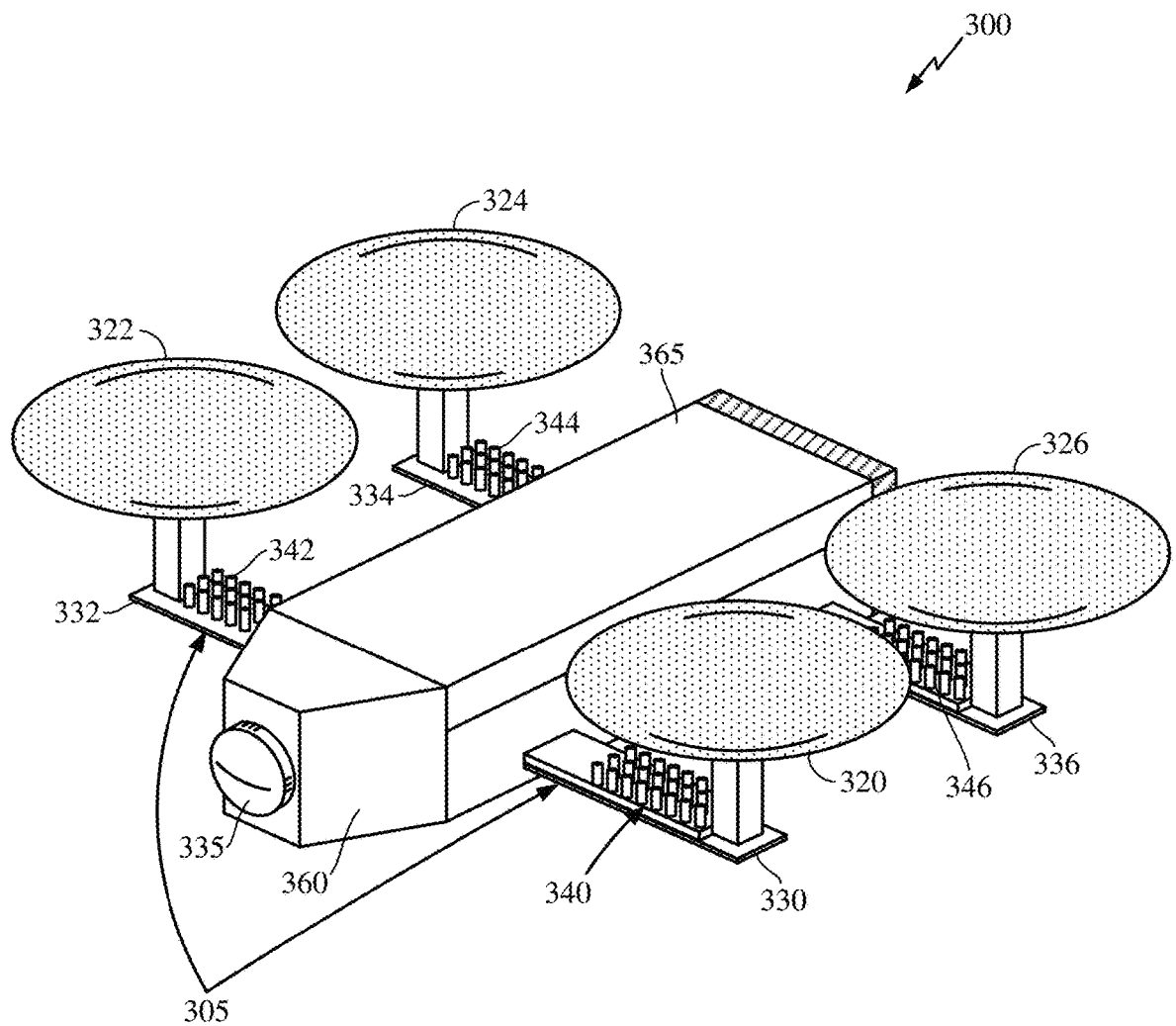
FIG. 3 illustrates one example of an UAV with four propellers and a plurality of pipes for passive cooling in accordance with some examples of the disclosure.

FIG. 3 illustrates one example of an UAV with four propellers and a plurality of pipes for passive cooling in accordance with some examples of the disclosure. As shown in FIG. 3, a UAV 300 (e.g. UAV 200) may include a pipe 305 (e.g. pipe 105 or pipe 205), a first plurality of fins 340 mounted on the pipe 305 in a first location, a second plurality of fins 342 mounted on the pipe 305 in a second location, a third plurality of fins 344 mounted on the pipe 305 in a third location, and a fourth plurality of fins 346 mounted on the pipe 305 in a fourth location. The UAV 300 may include a body enclosure 360, a camera 335 mounted on the front of the body enclosure 360, and a battery 365 mounted on the top of the body enclosure 360. The UAV 300 may include a first propeller 320 mounted on a first boom 330 above the first plurality of fins 340, a second propeller 322 mounted on a second boom 332 above the second plurality of fins 342, a third propeller 324 mounted on a third boom 334 above the third plurality of fins 344, and a fourth propeller 326 mounted on a fourth boom 336 above the fourth plurality of fins 346.

While four propellers (e.g. propeller 220 or propeller 222) are shown in FIG. 3, it should be understood that more or less propellers may be used. While four booms (e.g. boom 230) are shown in FIG. 3, it should be understood that more or less booms may be used depending on the number of propellers or plurality of fins. While four separate plurality of fins (e.g. first plurality of fins 240 or second plurality of fins 242) are shown in FIG. 3, it should be understood that more or less pluralities may be used and each plurality of fins may include one or more fins. While a single heat pipe 305 is illustrated in FIG. 3, it should be understood that one or more separate heat pipes may be used.

Figure 4:
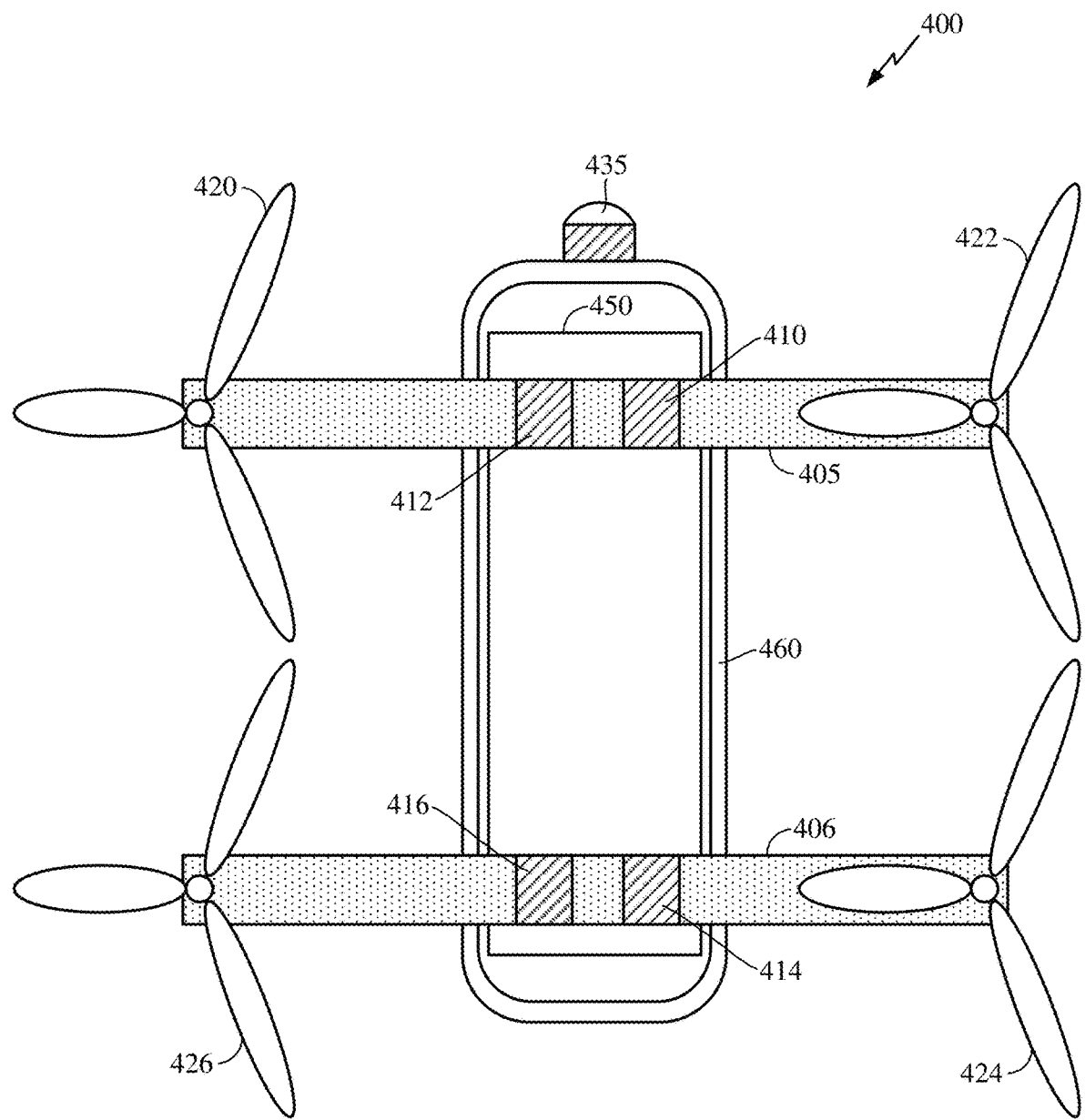
FIG. 4 illustrates one example of an UAV with four propellers and two straight pipes for passive cooling in accordance with some examples of the disclosure.

FIG. 4 illustrates one example of an UAV with four propellers and two straight pipes for passive cooling in accordance with some examples of the disclosure. As shown in FIG. 4, a UAV 400 (e.g. UAV 300) may include a first pipe 405 (e.g. pipe 305), a second pipe 406 (e.g. pipe 305), a body enclosure 460, a camera 435 mounted on the front of the body enclosure 460, and a printed circuit board 450 in the body enclosure 460. The UAV 400 may include a first propeller 420 mounted on one end of the first pipe 405, a second propeller 422 mounted on an opposite end of the first pipe 405, a third propeller 424 mounted on one end of the second pipe 406, and a fourth propeller 426 mounted on an opposite end of the second pipe 406. The UAV 400 may include a first semiconductor chip 410 (e.g. heat source 110) mounted on the first pipe 405, a second semiconductor chip 412 (e.g. heat source 110) mounted on the first pipe 405, a third semiconductor chip 414 (e.g. heat source 110) mounted on the second pipe 406, and a fourth semiconductor chip 416 (e.g. heat source 110) mounted on the second pipe 406. While four chips are illustrated in FIG. 4, more or less chips may be used and the distribution between the first pipe 405 and the second pipe 406 may not be equal. While the first pipe 405 and the second pipe 406 are illustrated as straight rectangular pipes, other shapes may be used such as oval, curved, for example, and the pipes may be physically and or fluidly connected.

Figure 5:
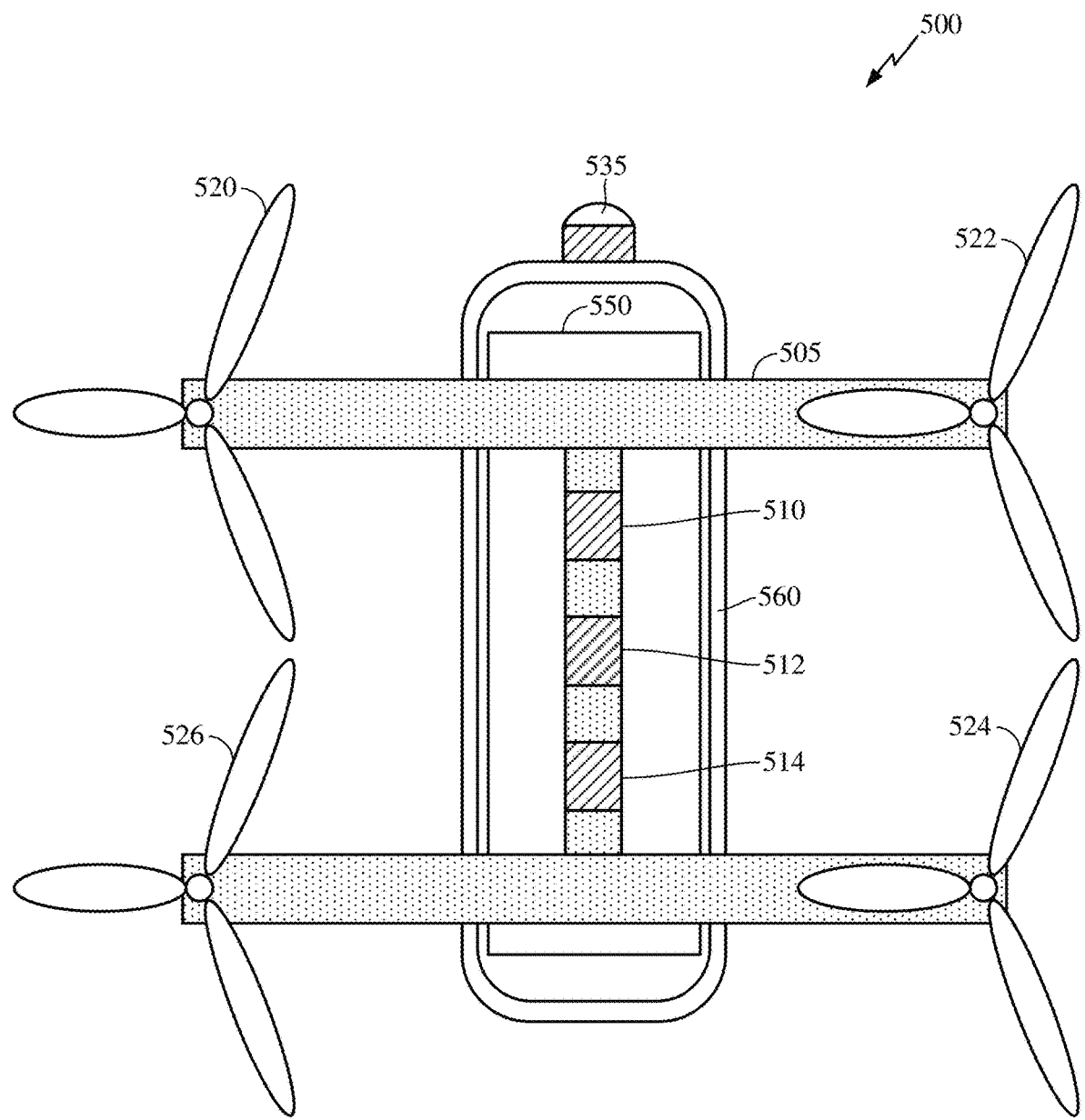
FIG. 5 illustrates one example of an UAV with four propellers and an H shaped pipe for passive cooling in accordance with some examples of the disclosure.

FIG. 5 illustrates one example of an UAV with four propellers and an H shaped pipe for passive cooling in accordance with some examples of the disclosure. As shown in FIG. 5, a UAV 500 (e.g. UAV 400) may include a pipe 505 (e.g. pipe 405), a body enclosure 560, a camera 535 mounted on the front of the body enclosure 560, and a printed circuit board 550 in the body enclosure 560. The UAV 500 may include a first propeller 520 mounted on one end of the pipe 505, a second propeller 522 mounted on a second end of the pipe 505, a third propeller 524 mounted on a third end of the pipe 505, and a fourth propeller 526 mounted on a fourth end of the pipe 505. The UAV 500 may include a first semiconductor chip 510 (e.g. heat source 110) mounted on the pipe 505, a second semiconductor chip 512 (e.g. heat source 110) mounted on the pipe 505, and a third semiconductor chip 514 (e.g. heat source 110) mounted on the pipe 505. While three chips are illustrated in FIG. 5, more or less chips may be used and the locations may not be only along the central portion of the pipe 405. While the pipe 505 is illustrated as an H shaped rectangular pipe, other shapes may be used such as oval, curved, for example, and the pipe may be physically and or fluidly connected.

Figure 6:
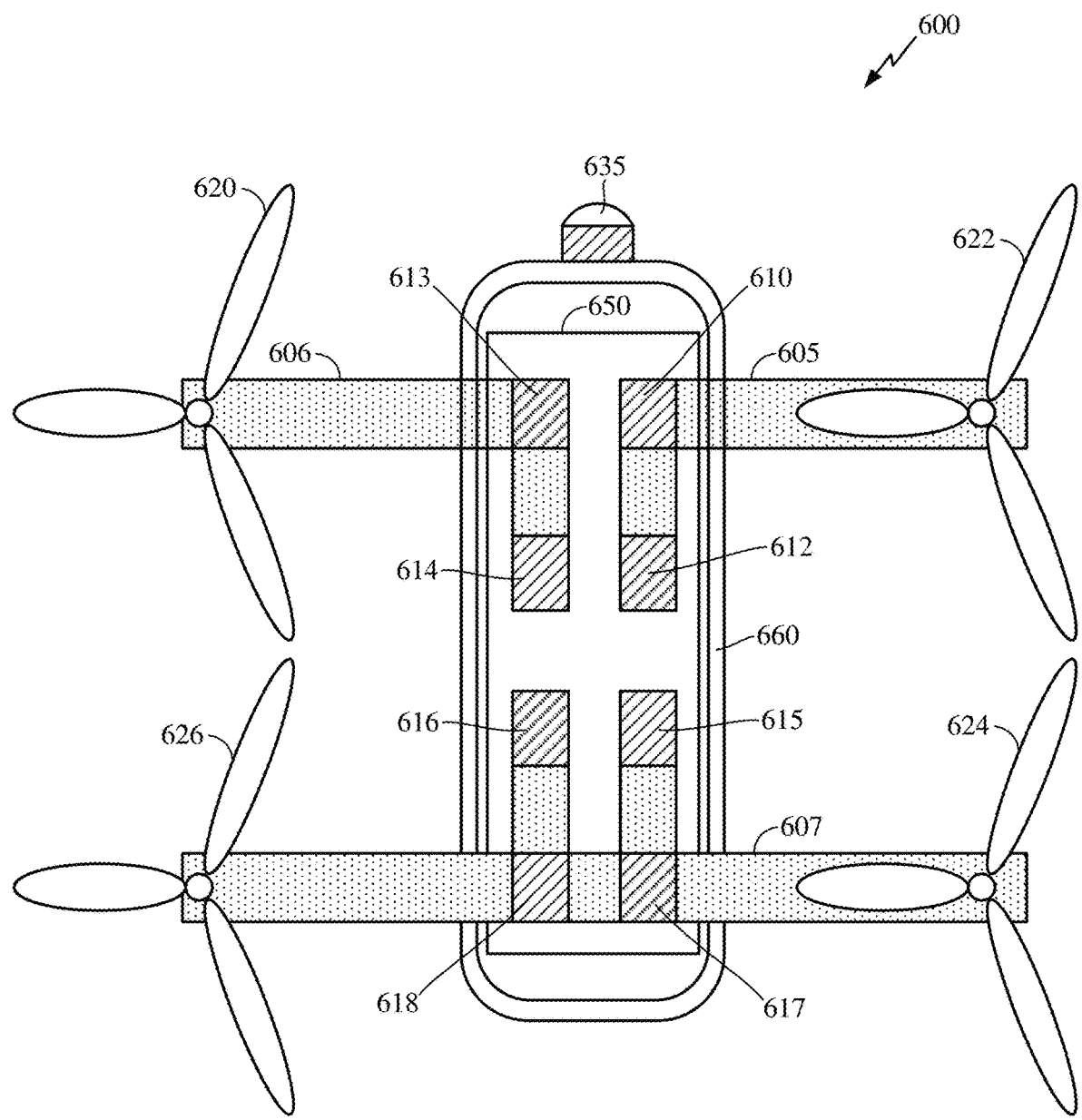
FIG. 6 illustrates one example of an UAV with four propellers, two unconnected L shaped pipes, and two connected L shaped pipes for passive cooling in accordance with some examples of the disclosure.

FIG. 6 illustrates one example of an UAV with four propellers, two unconnected L shaped pipes, and two connected L shaped pipes for passive cooling in accordance with some examples of the disclosure. As shown in FIG. 6, a UAV 600 (e.g. UAV 500) may include a first pipe 605 (e.g. pipe 305), a second pipe 606 (e.g. pipe 305), a third pipe 607, a body enclosure 660, a camera 635 mounted on the front of the body enclosure 660, and a printed circuit board 650 in the body enclosure 660. The UAV 600 may include a first propeller 620 mounted on one end of the first pipe 605, a second propeller 622 mounted on one end of the second pipe 606, a third propeller 624 mounted on one end of the third pipe 607, and a fourth propeller 626 mounted on an opposite end of the third pipe 607. The UAV 600 may include a first semiconductor chip 610 (e.g. heat source 110) mounted on the first pipe 605, a second semiconductor chip 612 (e.g. heat source 110) mounted on the first pipe 605, a third semiconductor chip 613 (e.g. heat source 110) mounted on the second pipe 606, a fourth semiconductor chip 614 (e.g. heat source 110) mounted on the second pipe 606, a fifth semiconductor chip 615 (e.g. heat source 110) mounted on the third pipe 607, a sixth semiconductor chip 616 (e.g. heat source 110) mounted on the third pipe 607, a seventh semiconductor chip 617 (e.g. heat source 110) mounted on the third pipe 607, and an eighth semiconductor chip 618 (e.g. heat source 110) mounted on the third pipe 607. While eight chips are illustrated in FIG. 6, more or less chips may be used and the distribution between the first pipe 605, the second pipe 606, and the third pipe 607 may not be equal. While the first pipe 605 and the second pipe 606 are illustrated as L shaped rectangular pipes and the third pipe 607, other shapes may be used such as oval, curved, for example, and the pipes may be physically and or fluidly connected.

Figure 7:
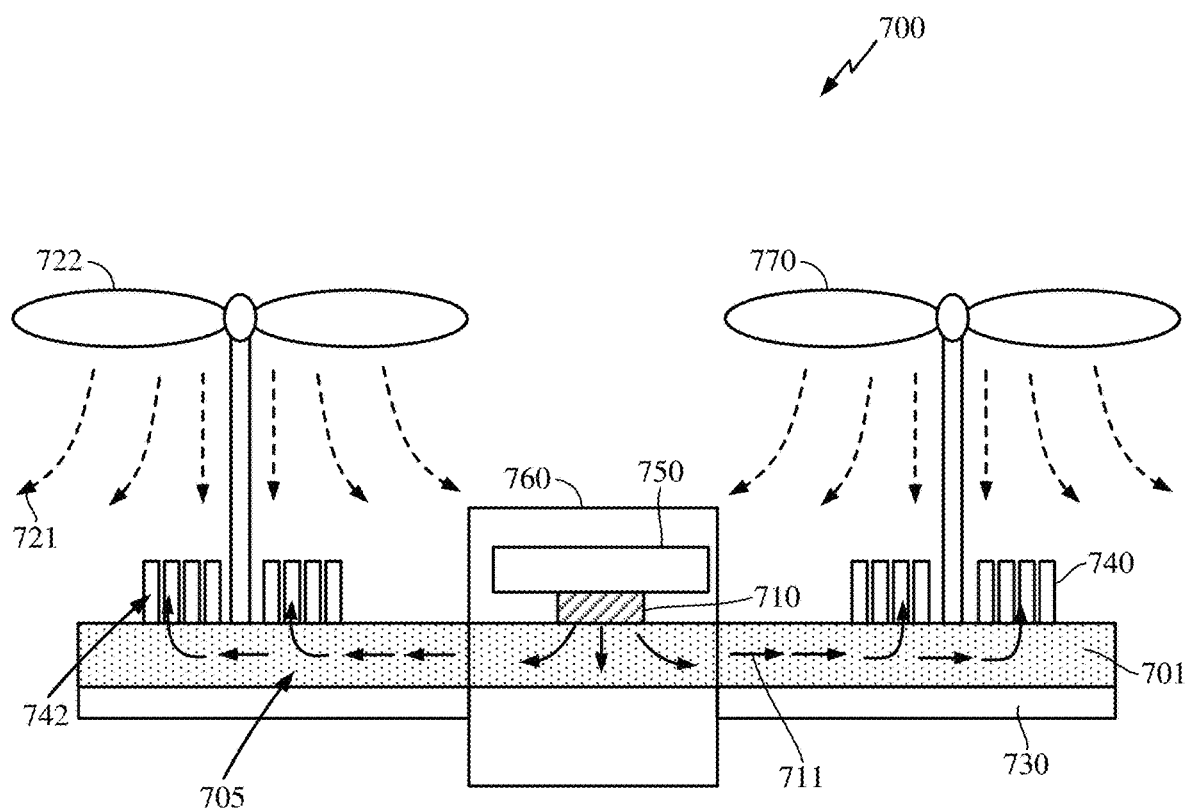
FIG. 7 illustrates one example of an UAV with a pipe for passive cooling in accordance with some examples of the disclosure.

FIG. 7 illustrates one example of an UAV with a pipe for passive cooling in accordance with some examples of the disclosure. As shown in FIG. 7, a UAV passive cooling apparatus 700 may include means for heat transfer 705 (e.g. pipe 105) configured to transfer heat 711 from a second location to a first location and a third location spaced from the second location, a semiconductor chip 710 mounted on the means for heat transfer 705 in the second location, first means for heat dissipation 740 (e.g. heat sink 140) located on a top of the means for heat transfer 705 in the first location, a second means for heat dissipation 742 (e.g. heat sink 142) located on a top of the means for heat transfer 705 in the third location, The means for heat transfer 705 enables heat 711 from the semiconductor chip 710 to travel in the means for heat transfer 705 from the second location to both the first means for heat dissipation 740 in the first location and the second means for heat dissipation 742 in the third location. The UAV passive cooling apparatus 700 may include a first means for air flow 720 (e.g. first propeller propeller 220) located above the first means for heat dissipation 740, a second means for air flow 722 (e.g. second propeller 222) located above the second means for heat dissipation 742. The first means for air flow 720 and the second means for air flow 722 may provide forced convective cooling air 721 at the first means for heat dissipation 740 and the second means for heat dissipation 742 respectively to dissipate heat 711 from the means for heat transfer 705 to ambient air with a bulk airflow of approximately 45 CFM. The UAV passive cooling apparatus 700 may include a boom 730 extending to either side of a body enclosure 760 that houses a printed circuit board 750 attached to the semiconductor chip 710 opposite the means for heat transfer 705.

The body enclosure 760 may be plastic or aluminum, for example, and may be hermetically sealed to protect the printed circuit board 750 and the semiconductor chip 710 from moisture, dust, and corrosive chemicals. The boom 730 may be plastic or aluminum, for example, and supports the portion of the means for heat transfer 705 extending outside body enclosure 760 as well as the first means for air flow 720 and the second means for air flow 722. The UAV 700 may include a means for heat conduction 701 (e.g. liquid 120 and vapor 130), the means for heat conduction 701 may be located in the means for heat transfer 705, and a means for liquid containment (e.g. wick structure 150) along an inner surface of the means for heat transfer 705, the means for liquid containment may be configured to allow the means for heat conduction 701 to travel within the means for liquid containment and to allow a vapor form of the means for heat conduction 701 to exit the means for liquid containment towards a center of the means for heat transfer 705. As discussed above with reference to FIGS. 1-6, the various components illustrated in FIG. 7 may be more or less than shown.

Figure 8A:
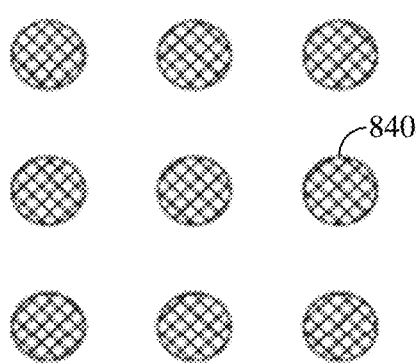
FIGS. 8A-G illustrate examples of heat sink configurations in accordance with some examples of the disclosure.
Figure 8B:
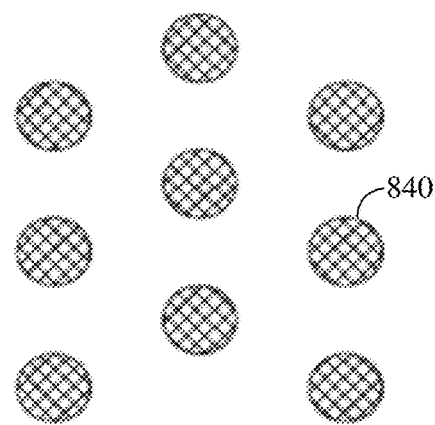
Figure 8C:
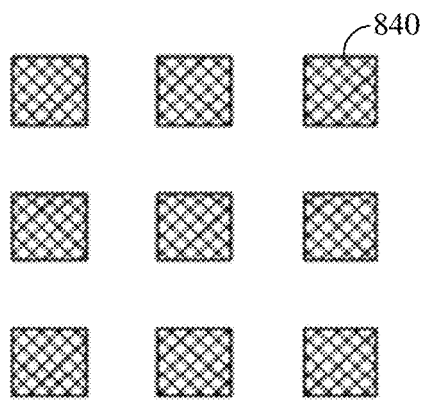
Figure 8D:
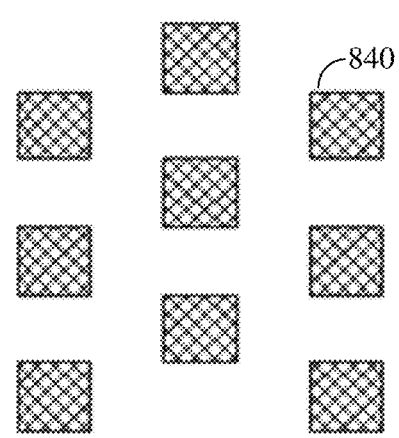
Figure 8E:
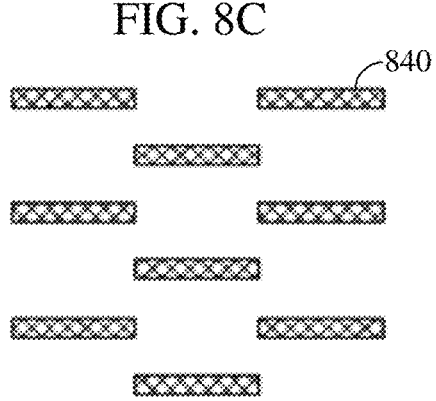
Figure 8F:
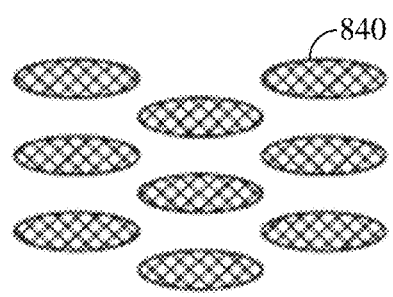
Figure 8G:
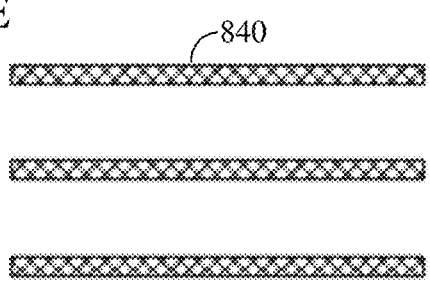

FIGS. 8A-G illustrate examples of heat sink (e.g. heat sink 140, 240, 242, 340, 342, 344, or 346, and means for heat dissipation 740 or 742) configurations in accordance with some examples of the disclosure. As shown in FIG. 8A, one configuration may include a plurality of circular heat sinks 140 arranged in rows and columns inline. As shown in FIG. 8B, one configuration may include a plurality of circular heat sinks 140 arranged in staggered rows and columns. As shown in FIG. 8C, one configuration may include a plurality of square heat sinks 140 arranged in rows and columns inline. As shown in FIG. 8D, one configuration may include a plurality of square heat sinks 140 arranged in staggered rows and columns. As shown in FIG. 8E, one configuration may include a plurality of rectangular or plate like heat sinks 140 arranged in staggered rows and columns. As shown in FIG. 8F, one configuration may include a plurality of oval or elliptical heat sinks 140 arranged in staggered rows and columns. As shown in FIG. 8G, one configuration may include a plurality of rectangular or plate like heat sinks 140 arranged in parallel.

One or more of the components, processes, features, and/or functions illustrated in FIGS. 1-8G may be rearranged and/or combined into a single component, process, feature or function or embodied in several components, processes, or functions. Additional elements, components, processes, and/or functions may also be added without departing from the disclosure. It should also be noted that FIGS. 1-8G and its corresponding description in the present disclosure is not limited to dies and/or ICs. In some implementations, FIGS. 1-8G and its corresponding description may be used to manufacture, create, provide, and/or produce integrated devices. In some implementations, a device may include a die, an integrated device, a die package, an integrated circuit (IC), a device package, an integrated circuit (IC) package, a wafer, a semiconductor device, a package on package (PoP) device, and/or an interposer.

The word "exemplary" is used herein to mean "serving as an example, instance, or illustration." Any details described herein as "exemplary" is not to be construed as advantageous over other examples. Likewise, the term "examples" does not mean that all examples include the discussed feature, advantage or mode of operation. Furthermore, a particular feature and/or structure can be combined with one or more other features and/or structures. Moreover, at least a portion of the apparatus described hereby can be configured to perform at least a portion of a method described hereby.

The terminology used herein is for the purpose of describing particular examples and is not intended to be limiting of examples of the disclosure. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, actions, operations, elements, and/or components, but do not preclude the presence or addition of one or more other features, integers, actions, operations, elements, components, and/or groups thereof.

It should be noted that the terms "connected," "coupled," or any variant thereof, mean any connection or coupling, either direct or indirect, between elements, and can encompass a presence of an intermediate element between two elements that are "connected" or "coupled" together via the intermediate element.

Any reference herein to an element using a designation such as "first," "second," and so forth does not limit the quantity and/or order of those elements. Rather, these designations are used as a convenient method of distinguishing between two or more elements and/or instances of an element. Also, unless stated otherwise, a set of elements can comprise one or more elements.

Nothing stated or illustrated depicted in this application is intended to dedicate any component, action, feature, benefit, advantage, or equivalent to the public, regardless of whether the component, action, feature, benefit, advantage, or the equivalent is recited in the claims.

Although some aspects have been described in connection with a device, it goes without saying that these aspects also constitute a description of the corresponding method, and so a block or a component of a device should also be understood as a corresponding method action or as a feature of a method action. Analogously thereto, aspects described in connection with or as a method action also constitute a description of a corresponding block or detail or feature of a corresponding device. Some or all of the method actions can be performed by a hardware apparatus (or using a hardware apparatus), such as, for example, a microprocessor, a programmable computer or an electronic circuit. In some examples, some or a plurality of the most important method actions can be performed by such an apparatus.

In the detailed description above it can be seen that different features are grouped together in examples. This manner of disclosure should not be understood as an intention that the claimed examples have more features than are explicitly mentioned in the respective claim. Rather, the situation is such that inventive content may reside in fewer than all features of an individual example disclosed. Therefore, the following claims should hereby be deemed to be incorporated in the description, wherein each claim by itself can stand as a separate example. Although each claim by itself can stand as a separate example, it should be noted that-although a dependent claim can refer in the claims to a specific combination with one or a plurality of claims-other examples can also encompass or include a combination of said dependent claim with the subject matter of any other dependent claim or a combination of any feature with other dependent and independent claims. Such combinations are proposed herein, unless it is explicitly expressed that a specific combination is not intended. Furthermore, it is also intended that features of a claim can be included in any other independent claim, even if said claim is not directly dependent on the independent claim.

It should furthermore be noted that methods, systems, and apparatus disclosed in the description or in the claims can be implemented by a device comprising means for performing the respective actions of these examples While the foregoing disclosure shows illustrative examples of the disclosure, it should be noted that various changes and modifications could be made herein without departing from the scope of the disclosure as defined by the appended claims. The functions and/or actions of the method claims in accordance with the examples of the disclosure described herein need not be performed in any particular order. Additionally, well-known elements will not be described in detail or may be omitted so as to not obscure the relevant details of the aspects and examples disclosed herein. Furthermore, although elements of the disclosure may be described or claimed in the singular, the plural is contemplated unless limitation to the singular is explicitly stated.

What is claimed is:

1. An unmanned aerial vehicle (UAV), comprising:
   a body;
   a pipe with a fluid included therein, wherein the pipe includes:
      a first portion partially outside the body;
      a second portion partially outside the body, the first portion directly coupled to the second portion inside the body; and
      a first branch portion extending from the first portion, the second portion, or a combination thereof, the first branch portion being entirely inside the body; and
   a first plurality of fins located on a top of the pipe in a first location of the first portion of the pipe outside the body;
   a second plurality of fins located on the top of the pipe in a second location of the second portion of the pipe outside the body, wherein all fins mounted on the top of the pipe are directly above the pipe;
   a first heat source located in the body and attached to the top of the pipe in a third location of the first branch portion of the pipe;
   a first propeller located above the first plurality of fins;
   a second propeller located above the second plurality of fins; and
   a wick structure along an entire inner surface of the pipe, the wick structure configured to allow the fluid to travel within the wick structure and to allow a vapor form of the fluid to exit the wick structure towards a center of the pipe.

2. The UAV of claim 1, wherein the wick structure is configured to cause the fluid to evaporate within the pipe at the third location and form a vapor that moves toward the first location or the second location where the vapor to condenses back into the fluid.

3. The UAV of claim 2, wherein the wick structure is one of a honeycomb, mesh, fiber, or powder.

4. The UAV of claim 1, wherein each of the first plurality of fins or the second plurality of fins is a pin fin.

5. The UAV of claim 1, wherein the pipe is composed of one of aluminum, copper, or plastic materials.

6. The UAV of claim 1, wherein the first plurality of fins or the second plurality of fins is one of a plurality of circular fins arranged inline, a plurality of circular fins arranged in a staggered formation, a plurality of square fins arranged inline, a plurality of square fins arranged in a staggered formation, a plurality of rectangular fins arranged in a staggered formation, a plurality of oval fins arranged in a staggered formation, or a plurality of rectangular fins arranged in parallel.

7. The UAV of claim 1, further comprising one or more other propellers in multiple locations, each spaced from the body.

8. The UAV of claim 1, wherein the pipe has a thickness between 0.5 mm and 5 mm.

9. The UAV of claim 1, wherein the body is hermetically sealed.

10. The UAV of claim 1, wherein:
    the first branch portion of the pipe extends from the first portion of the pipe,
    the pipe further includes a second branch portion extending from the second portion of the pipe and entirely inside the body, and
    the UAV further comprise a second heat source located in the body and attached to the top of the pipe in a fourth location of the second branch portion of the pipe.

* * * * *